March 20, 1934.  G. W. FARLEY ET AL  1,951,401

WINDOW RAISING AND LOWERING DEVICE

Filed Jan. 23, 1933   3 Sheets-Sheet 1

Inventor
GEORGE W. FARLEY
RUDOLPH M. HANSEN

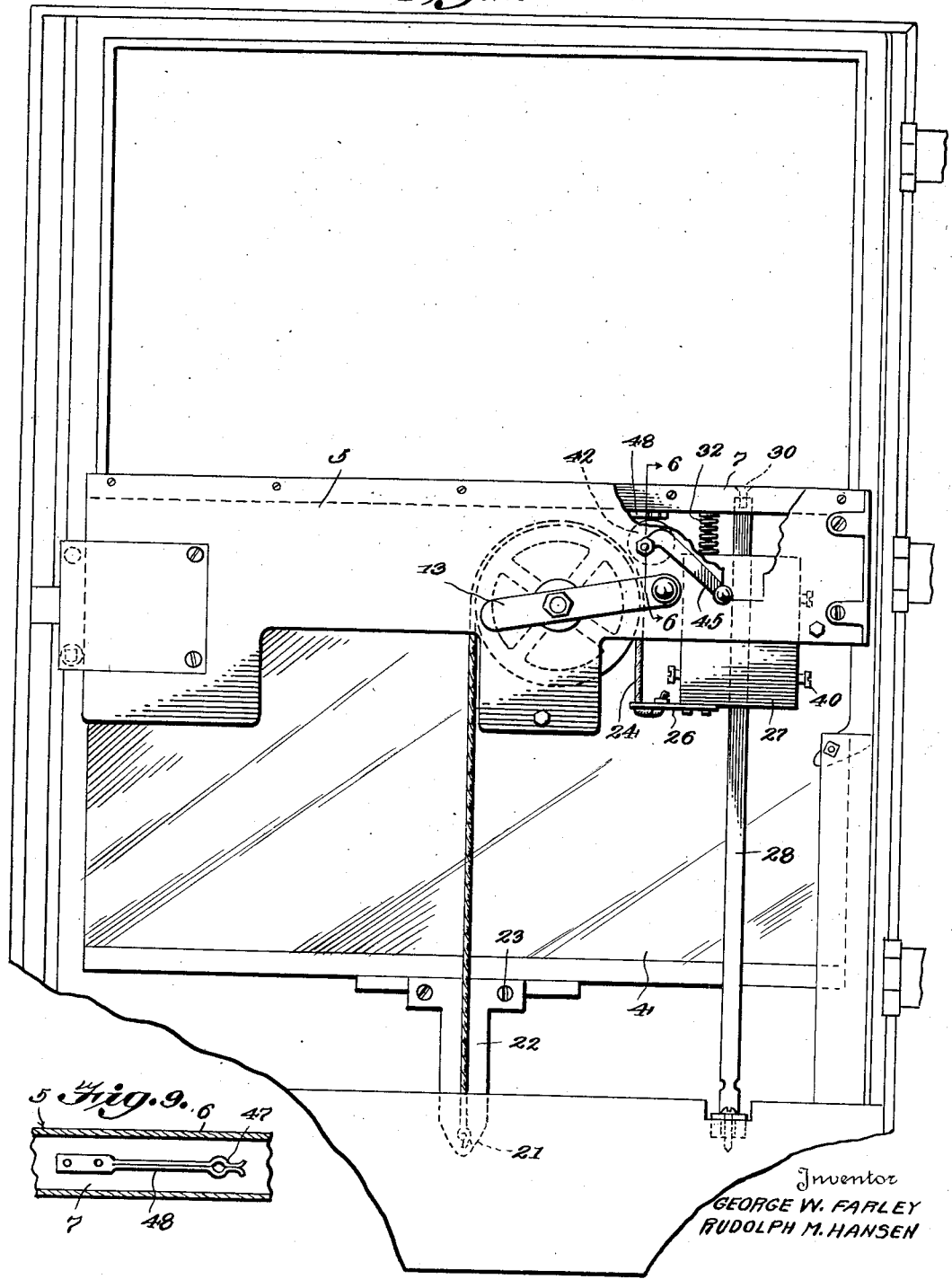

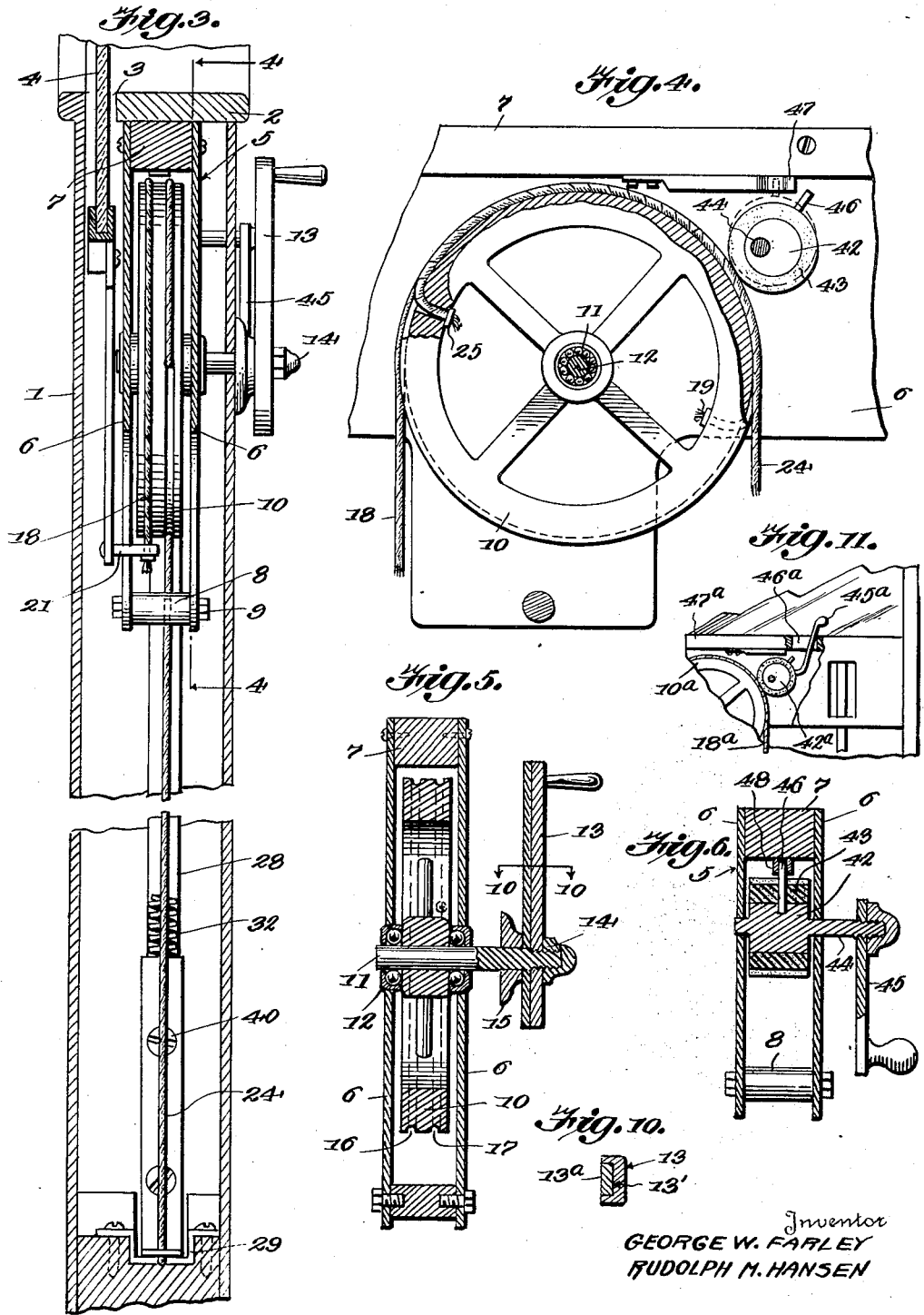

Patented Mar. 20, 1934

1,951,401

UNITED STATES PATENT OFFICE 1,951,401

WINDOW RAISING AND LOWERING DEVICE

George W. Farley and Rudolph M. Hansen, Eureka, Calif.

Application January 23, 1933, Serial No. 653,162

10 Claims. (Cl. 268—130)

This invention relates to a window raising and lowering mechanism, and has for its object the production of a simple and efficient means which will permit the opening and closing of a window, particularly a vehicle window such as an automobile window, thereby providing a noiseless quickly opening and closing device which will greatly promote the safety in driving an automobile or other similar vehicle.

Another object of this invention is the production of a simple and efficient control means for raising and lowering an automobile window or other similar window, the parts of which are so constructed as to eliminate rattle, and at the same time permit the opening and closing of the window with a minimum amount of effort and in a minimum amount of time.

A further object of this invention is the production of a simple and efficient means which will permit the window to be easily adjusted to provide the desired size opening, and at the same time permit the window to be moved to a fully opened or fully closed position without the necessity of continuously cranking as is required with the present type of vehicle window.

With these and other objects in view, this invention consists in certain novel constructions, combinations and arrangements of parts as will be hereinafter fully described and claimed.

In the drawings:—

Figure 2 is a view in side elevation certain parts being broken away to show the window raising and lowering mechanism, the window being shown in its lowered position, the window in Figure 1 having been shown in its raised position;

Figure 3 is an enlarged sectional view taken on line 3—3 of Figure 1;

Figure 4 is a sectional view taken on line 4—4 of Figure 3;

Figure 5 is a section taken on line 5—5 of Figure 1;

Figure 6 is a section taken on line 6—6 of Figure 2;

Figure 9 is a bottom plan view of the check catch used in connection with the present invention, the side plate of the cross member being shown in longitudinal section;

Figure 10 is a section taken on line 10—10 of Figure 5; and

Figure 11 is a side elevation partly in section showing a modified form of the brake mechanism wherein the eccentric brake is actuated by an operating handle or lever extending up through the window sill or door.

Figure 1:
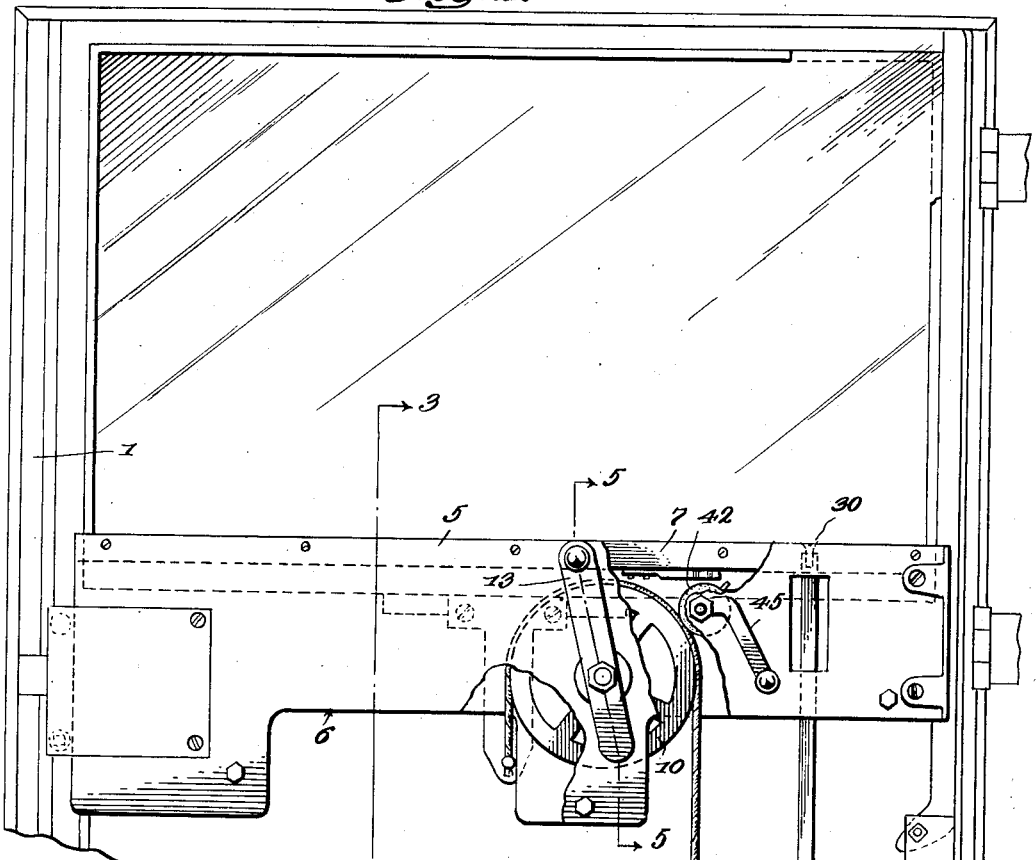
Figure 1 is a side elevation of the mechanism employed for raising and lowering the window, the inner panel of the door being removed to show clearly the mechanical structure of the window-operating mechanism.

By referring to the drawings, it will be seen that 1 designates the frame of the door which may be of any suitable or desired structure having the usual window sill 2, which window sill 2 is provided with the window panel opening 3, through which the window panel 4 extends.

A frame 5 is supported upon the door frame 1 in any suitable or desired manner and extends transversely across the door frame 1 and is preferably hung under the sill 2 as shown in Figure 3. This frame 5 constitutes a support for the window raising and lowering mechanism which will be hereinafter described. The frame 5 preferably comprises a pair of substantially parallel plates 6 which are arranged in spaced relation and which may be supported upon the door frame 1 in any conventional manner as is common to the trade, depending largely upon the particular type of door upon which the device is mounted. Interposed between the upper edges of the plates 6, is a longitudinally extending strip 7 which preferably extends longitudinally of the frame 5, and the lower edges of the plates 6 may be spaced by means of suitable spreaders 8, which spreaders may be secured to the plates 6 by suitable bolts 9.

A grooved pulley 10 is mounted between the plates 6 of the frame 5, and this grooved pulley 10 is supported upon an operating shaft 11, which shaft is journaled upon the frame 5 by means of the bearings 12 which are seated in the plates 6, as shown clearly in Figure 5. A crank 13 is secured to the outer end of the shaft 11, as shown clearly in Figure 5, and may be locked in position by means of the suitable locking nut 14, the crank being clamped on the shaft 11 and preferably keyed thereto or otherwise secured so as to cause the shaft 11 to rotate as the crank 13 is operated. A suitable washer 15 may be employed for abutting against the inner face of the frame 1 of the door, as shown in Figure 3 and also illustrated in Figure 5. This crank 13 preferably comprises a channel member which is substantially U-shaped in cross section having a channel portion 13' formed therein for the purpose of receiving a filler strip 13a, clearly illustrated in Figure 10. This type of construction will greatly strengthen the handle or crank 13.

As shown in Figures 3 and 5, the grooved pulley 10 is provided with a pair of spaced grooves 16 and 17 respectively. A lifting cable 18 is adapted to fit within the groove 16 of the pulley 10, as shown, and this lifting cable 18 has its end 19 extended through the pulley 10 and anchored, as illustrated in Figure 4. This lifting cable 18 is secured at its opposite or lower end to a connecting pin 21 carried by the lower extremity of the hanger plate 22, which hanger plate is hung under the lower end of the window panel 4 and secured thereto by means of suitable securing screws 23, as is clearly illustrated in Figure 2.

A lowering cable 24 is fitted within the channel or groove 17 of the grooved pulley 10 as shown in Figure 4 and has its end 25 extended through the periphery of the pulley 10 and anchored in engagement with the pulley in any suitable or desired manner, such for instance by tying or otherwise securing the terminal of the cable 24. The cables 18 and 24 extend over the periphery of the pulley 10 in opposite directions, as fully shown in Figure 4.

The cable 24, at its lower end is connected to a plate 26, which plate 26 projects beyond and is secured to the lower end of the sliding weight 27, which sliding weight 27 is vertically slidable upon the supporting or track rod 28 which track rod preferably is square in cross section. The lower end of this track rod 28 is anchored and secured to a substantially U-shaped anchoring plate 29 for fixing this track rod 28 in engagement with the door frame 1. Any suitable or desired means may be employed for firmly anchoring the lower end of this track rod 28. The upper end may be secured to the strip 7 and anchored in engagement therewith by means of a suitable locking screw 30 which passes through the strip 7 and into the upper end of the track rod 28, as shown clearly in Figures 1 and 2 of the drawings.

Figure 7:
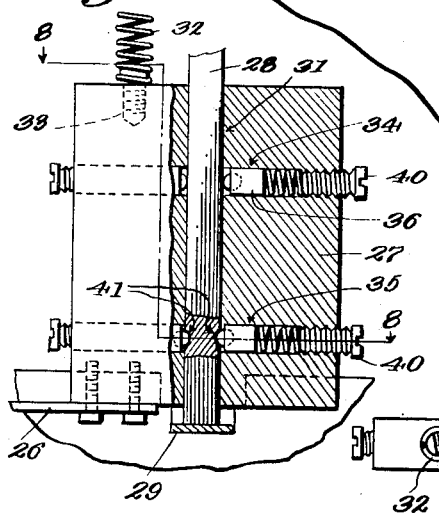
Figure 7 is an enlarged side elevation, partly in section, of the weight which controls the operation of the raising and lowering mechanism, the weight being shown mounted upon a portion of the guiding bar or rod.
Figure 8:
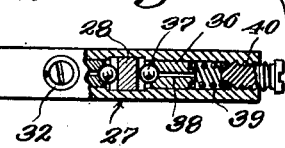
Figure 8 is a section taken on line 8—8 of Figure 7.

The weight 27 is preferably of lead or other heavy material to reduce the size thereof, but this weight may be made of any suitable or desired material such as lead, mercury, or other similar substance. The weight 27 is provided with a vertically extending centrally located square aperture 31 through which the squared track rod 28 passes, this track rod 28 preferably fitting snugly within the aperture 31, as shown in Figure 7. The upper end of the weight 27 carries a buffer spring 32, preferably of coiled spring type, which is anchored to the top end of the weight 27 by means of a suitable securing screw 33. This buffer spring 32 is adapted to contact with the lower face of the filler strip 7, as shown in Figure 2, when the window panel 4 is in its lowermost position and this spring will constitute a shock absorber as well as providing means for overcoming the inertia of the weight when starting the motion of the weight in the opposite downward direction when it is desired to raise the window panel 4. The weight 27 is provided with an upper pair of transversely aligned apertures 34 and a lower pair of transversely aligned apertures 35. Within each of the apertures 34 and 35 is mounted a bearing carrying sleeve 36, which sleeve 36 carries a ball bearing 37, the ball bearings 37 of the sleeves 36 normally contacting with the track rod 28, as shown clearly in Figure 7. These sleeves 36 are provided with longitudinally extending channels or apertures 38 to permit lubricant to flow through the sleeves 36 to the bearings 37. Each sleeve 36 is engaged by means of a coil spring 39, and the tension of this coil spring 39 may be regulated and adjusted by means of the adjusting screw 40, the adjusting screw 40 also constituting means for closing the outer ends of the various aligned apertures 34 and 35 as will be obvious by considering the drawings, particularly Figures 7 and 8. The apertures 34 and 35 are preferably filled with lubricant, and the lubricant may then flow through the passageways or portions 38 to the bearings and the tension of the bearings may be regulated through the medium of the springs and adjusting screws 40. The track rod 28 is provided with a plurality of substantially circular notches 41 near the lower end thereof, which notches are adapted to be engaged by the lowermost bearings carried within the channels or apertures 35 of the weight 27 when the weight 27 is in its lowermost position thereby anchoring the weight in this position and holding the weight against dancing movement and preventing the weight from jumping vertically of the track rod 28. The arrangement of the bearings upon the weight 27 will provide an efficient means for guiding the travel of the weight in its vertical as well as its downward movement.

In order to permit the window panel to be firmly held in an adjusted position, there is provided a special brake mechanism which comprises an eccentric brake wheel 42 which is carried by the frame 5 and is mounted adjacent the periphery of the grooved pulley 10. This eccentric brake wheel 42 is preferably provided with a brake band 43 of suitable material to provide a proper frictional brake action upon the periphery of the grooved pulley 10 when the eccentric brake 42 is rotated into frictional engagement with the pulley 10. The eccentric brake 42 is mounted eccentrically on its supporting shaft 44 in a position above the central axis of the grooved pulley 10 so as to cause the brake band 43 of the eccentric brake 42 to be frictionally tightened in engagement with the periphery of the grooved pulley 10 when the operating lever 45 carried by the shaft 44 is swung downwardly. This operating lever 45 is actuated by the hand of the operator and is located upon the exterior of the inner face of the door, as shown in Figures 1, 2 and 3, where it may be easily accessible to the operator for releasing the eccentric brake 42. When the eccentric brake 42 has been thrown into frictional engagement with the periphery of the grooved pulley 10, the counter-clockwise movement of the pulley 10 will be resisted due to the fact that any urge of this counter-clockwise movement will tend to more tightly draw or pull the eccentric brake into firm engagement with the periphery of the grooved pulley 10. When it is desired to release the eccentric brake 42, the operating lever 45 is merely moved upwardly to provide a proper rotation for the eccentric brake and to move the eccentric brake out of frictional contact with the periphery of the grooved pulley 10, thereby permitting the grooved pulley 10 to freely operate. In order that this eccentric brake may be held fixedly out of contact with the grooved pulley 10, there is provided a locking pin 46 which extends from the periphery of the eccentric brake 42 and is adapted to fit within the spring jaws 47 of the check catch 48, shown clearly in Figures 4 and 9. This check catch 48 is preferably anchored or secured to the underface of the filler or spacing strip 7.

In Figure 11 there is shown a modified form of the invention wherein the pulley 10a which carries the cable 18a is engaged by the eccentric brake 42a, which eccentric brake 42a is actuated by means of a lever or operating handle 45a extending up through an aperture 46a formed in the window sill 47a.

The operation of the device is as follows:—

Presuming the window panel 4 to be in a raised or closed position, this panel may be immediately lowered by merely raising the lever 45 to draw the eccentric brake 42 out of contact with the periphery of the grooved pulley 10. This upward spring of the lever 45 will throw the pin 46 into gripping engagement with the spring jaws 47 of the check catch 48, and the eccentric brake will in this way be held out of engagement with the periphery of the grooved pulley 10. The pulley 10 will then be released and free to rotate, thereby causing the window panel 4 to begin its descent or downward movement, the pulley 10 traveling in a counter-clockwise direction for this purpose, the counter-clockwise rotation being caused by the pull of the cable 18 upon the pulley 10, this cable 18 being connected to the hanger plate 22. The downward movement is caused by the difference of weights on the cable 18 and the cable 24, the sum of the weights being slightly greater than the sum of weights on the cable 24. If the panel 4 is allowed to drop to a fully opened position, the weight 27 will be raised to the top of the track rod 28, the buffer spring 32 contacting with the bottom face of the filler strip 7, thereby preventing unnecessary motion of the weight or unnecessary noise. If it is desired to stop the window or panel 4 at any position, a slight swing of the arm 45 in a downward direction for causing the eccentric brake 42 to contact with the periphery of the pulley 10 will hold the window panel in its desired adjusted position due to this frictional brake contact. In other words to stop the downward movement of the window panel at any desired position, it is only necessary to swing the lever 45 in a clockwise direction to establish contact between the eccentric brake 42 and the wheel or pulley 10.

Should the window be open fully, and it be desired to close the window slightly or completely, the eccentric brake 42 will be cleared from the pulley 10 by swinging the lever 45 upwardly in a counter-clockwise direction. The crank 13 may then be rotated in a clockwise direction for approximately three-fourths of a complete revolution, and this movement will cause the weight 27 to drop down to the lower end of the track rod 28, the spring 32 tending to overcome inertia when starting. When the weight 27 reaches its lower position, the lower set of bearings will fit in the notches 41 and firmly hold the weight 27 in position until it is again released. The lever 45 is then swung downwardly in a clockwise direction throwing the eccentric brake 42 into engagement with the wheel or pulley 10, and thereby holding the pulley 10 in position. Furthermore, it should be understood that the pulley 10 may be stopped at any point of its rotation, for adjusting the window in a partially raised or lowered position.

From the foregoing description, it will be seen that a very simple and efficient window closing and opening device has been produced which is particularly adapted for raising and lowering glass panels of a vehicle window such as a motor vehicle, or other similar vehicle. The present device is particularly adapted for raising and lowering the window in a very short interval of time, particularly the lowering of the window with high speed. The device is particularly adapted to windows of automobiles which are used by the driver of the vehicle when giving hand signals, since the window will drop automatically with a very small movement which may be imparted to the lever 45. Furthermore, the window may be stopped in any adjusted position merely by the operation of the lever 45 which constitutes an eccentric brake for the wheel or pulley 10. Also, the window or panel 4 may be raised to its fully closed position from its fully open position by less than one complete rotation of the operating handle.

From the foregoing description, and illustrations, it will be obvious that an operator may drive a vehicle with the window closed in rainy, cold, or otherwise inclement weather, and that he can lower the window to make signals or for other purposes in sufficient time for any emergency which may arise. This structure, therefore, has provided means whereby the factors of comfort and safety have been greatly enhanced.

Furthermore, it should be understood that a device has been perfected which possesses great speed of operation, as well as a device which is simple of construction and which may be easily operated and at the same time will possess considerable durability. In constructing the device, it is preferable to mount the same in such a way as to mount the weight adjacent the inside of the door, and by having this weight as small as possible and made of as heavy material as possible, the device will be accommodated in a minimum amount of space. The structure provides a very noiseless, as well as a self-lubricating structure.

It should be understood that certain detail changes in the mechanical construction may be made without departing from the spirit of the invention so long as these changes fall within the scope of the appended claims.

Having described the invention, what is claimed as new is:—

1. A window raising and lowering mechanism of the class described comprising a frame, a panel slidably mounted within the frame, a hanger plate carried by said panel, a pulley for operating said panel, flexible means connected to said pulley and to said hanger plate whereby said panel may be raised by the rotation of said pulley in one direction, an operating crank for said pulley, a counterbalancing weight, flexible means connected to said counterbalancing weight and also connected to said pulley and extending in an opposite direction to said first mentioned flexible means around said pulley, a guiding track rod for said weight, abutment means carried at the upper end of said rod, and resilient buffer means carried by the upper end of said weight for contacting with said abutment means.

2. A window raising and lowering mechanism of the class described comprising a frame, a panel slidably mounted within the frame, a hanger plate carried by said panel, a pulley for operating said panel, flexible means connected to said pulley and to said hanger plate whereby said panel may be raised by the rotation of said pulley in one direction, an operating crank for said pulley, a counterbalancing weight, flexible means connected to said counterbalancing weight and also connected to said pulley and extending in an opposite direction to said first mentioned flexible means around said pulley, a guiding track rod for said weight, abutment means carried at the upper end of said rod, resilient buffer means carried by the upper end of said weight for contacting with said abutment means, and means for engaging said pulley for locking the same in a set position and adapted to be released from said pulley for permitting the rotation of the pulley in a direction for lowering said panel.

3. A window raising and lowering mechanism of the class described comprising a frame, a panel slidably mounted within the frame, a hanger plate carried by said panel, a pulley for operating said panel, flexible means connected to said pulley and to said hanger plate whereby said panel may be raised by the rotation of said pulley in one direction, an operating crank for said pulley, a counterbalancing weight, flexible means connected to said counterbalancing weight and also connected to said pulley and extending in an opposite direction to said first mentioned flexible means around said pulley, a guiding track rod for said weight, abutment means carried at the upper end of said rod, resilient buffer means carried by the upper end of said weight for contacting with said abutment means, means for engaging said pulley for locking the same in a set position and adapted to be released from said pulley for permitting the rotation of the pulley in a direction for lowering said panel, said crank of said pulley wheel comprising a body being substantially U-shaped in cross section and having a filler strip fitting within the U-shaped body for re-enforcing the crank handle.

4. A window raising and lowering device of the class described comprising a frame, a panel slidably mounted in the frame, means for raising said panel, a counterbalancing weight for facilitating the lowering of the panel, a guiding bar constituting a track for said weight, and resilient bearings carried by said weight and contacting with said track bar.

5. A window raising and lowering device of the class described comprising a frame, a panel slidably mounted in the frame, means for raising said panel, a counterbalancing weight for facilitating the lowering of the panel, a guiding bar constituting a track for said weight, said weight having a plurality of series of aligned apertures, a resilient bearing placed within each aperture for contacting with said bar, and means for regulating the tension of said resilient bearings upon said bar.

6. A window raising and lowering device of the class described comprising a frame, a panel slidably mounted in the frame, means for raising and lowering said panel, a counterbalancing weight for facilitating the lowering of the panel, a guiding bar constituting a track for said weight, said weight having a plurality of series of aligned apertures, a resilient bearing placed within each aperture for contacting with said bar, means for regulating the tension of said resilient bearings upon said bar, said last mentioned means comprising a resilient spring, and a threaded member contacting with said spring for facilitating the adjustment of the tension of the spring.

7. A device of the class described comprising a frame, a panel slidably mounted within the frame, means for raising the panel within the frame, a counterbalancing weight for facilitating the lowering of the panel, a guiding track rod, a weight slidably mounted upon the track rod, means for connecting the weight in conjunction with said panel, a plurality of spring-pressed bearings carried by the weight and engaging the track rod, each bearing comprising an apertured casing, a ball carried by one end of the apertured casing, the apertured casing constituting means for facilitating the lubrication of the bearings, a spring-engaging casing, and an adjusting screw for adjusting the spring.

8. A window raising and lowering mechanism of the class described comprising a frame constituting a door, a panel slidably mounted within the door, a controlling pulley, flexible means connected to the controlling pulley and the panel, a counterbalancing weight mounted near the hinged side of the door, guiding means for guiding said weight in a vertical direction, flexible means connecting said pulley to said weight, spring-pressed bearings carried by said weight, said guiding means comprising a guiding rod having notches near the lower end thereof, some of said bearings being adapted to engage said notches for holding said weight in a set lowered position, and means for controlling the rotation of said pulley.

9. A window raising and lowering mechanism of the class described particularly adapted for automobile doors and the like, comprising a frame, a panel slidably mounted within the frame, a pulley for operating said panel carried by the frame, flexible means passing over the pulley and engaging the panel, an operating crank for said pulley, a counterbalancing weight carried by said frame, a second flexible means passing over the pulley engaging the counterbalancing weight, an eccentric brake carried by said frame adjacent the periphery of said pulley and adapted to be brought into clamping engagement with the periphery of the pulley to hold the pulley in a set position, and an operating handle connected to said eccentric brake and located adjacent the operating crank of said pulley and accessible from the exterior of said frame whereby said eccentric brake may be easily released from gripping engagement with the periphery of said pulley to permit said panel to instantaneously drop to an open position.

10. A window raising and lowering mechanism of the class described particularly adapted for use in connection with automobile and similar windows comprising a frame, a window panel slidably mounted upon the frame, an operating pulley, flexible means passing over the pulley and engaging said panel for facilitating the raising and lowering of the panel as the pulley is rotated, an operating crank for said pulley, a counterbalancing weight, a second flexible means passing over said pulley engaging the counterbalancing weight, an eccentric brake carried by said frame and mounted so as to contact with the periphery of said pulley for facilitating the locking of the pulley in a set position by the rotation of said eccentric brake, an operating handle accessible from the exterior of the frame and engaging said eccentric brake and located near said operating crank for throwing the eccentric brake into and out of operative position for permitting the release of the brake from engagement with the periphery of said pulley and consequently permitting the immediate dropping of said panel, and shock absorbing means for absorbing the shock of the panel when it drops to its lowered position.

GEORGE W. FARLEY.
RUDOLPH M. HANSEN.